(12) United States Patent
Atallah et al.

(10) Patent No.: US 9,444,318 B2
(45) Date of Patent: Sep. 13, 2016

(54) MAGNETIC GEAR WITH FIRST AND SECOND MEMBERS ARRANGED TO INTERACT IN A MAGNETICALLY GEARED MANNER

(71) Applicant: Magnomatics Limited, Sheffield (GB)

(72) Inventors: Kais Atallah, Sheffield (GB); Jan Jozef Rens, Sheffield (GB)

(73) Assignee: MAGNOMATICS LIMITED, Sheffield (GB)

( * ) Notice: Subject to any disclaimer, the term of this patent is extended or adjusted under 35 U.S.C. 154(b) by 0 days.

(21) Appl. No.: 14/265,135

(22) Filed: Apr. 29, 2014

(65) Prior Publication Data

US 2015/0069871 A1    Mar. 12, 2015

Related U.S. Application Data

(63) Continuation of application No. 12/995,798, filed as application No. PCT/GB2009/001365 on May 29, 2009, now abandoned.

(30) Foreign Application Priority Data

Jun. 3, 2008 (GB) .................................. 0810097.6

(51) Int. Cl.
  *H02K 49/10* (2006.01)
  *H02K 49/06* (2006.01)
  *H02K 7/18* (2006.01)

(52) U.S. Cl.
  CPC ............ *H02K 49/06* (2013.01); *H02K 49/102* (2013.01); *H02K 7/1838* (2013.01); *Y02E 10/725* (2013.01)

(58) Field of Classification Search
  CPC ... H02K 51/00; H02K 49/102; H02K 49/104
  USPC ................. 310/266, 103, 104, 114, 115, 181
  See application file for complete search history.

(56) References Cited

U.S. PATENT DOCUMENTS

| | | | |
|---|---|---|---|
| 4,644,206 A | 2/1987 | Smith | |
| 5,710,471 A | 1/1998 | Syverson et al. | |
| 5,723,928 A * | 3/1998 | Imai et al. | 310/114 |
| 7,791,235 B2 | 9/2010 | Kern et al. | |
| 2004/0108781 A1 | 6/2004 | Razzell et al. | |
| 2004/0232800 A1* | 11/2004 | Seguchi et al. | 310/266 |
| 2006/0214535 A1* | 9/2006 | Salmon | 310/309 |
| 2008/0030090 A1* | 2/2008 | Abe et al. | 310/103 |
| 2008/0238232 A1* | 10/2008 | Bando et al. | 310/126 |
| 2008/0296997 A1 | 12/2008 | Bando et al. | |

(Continued)

FOREIGN PATENT DOCUMENTS

| | | |
|---|---|---|
| EP | 0197849 | 10/1986 |
| EP | 0225074 | 6/1987 |

(Continued)

*Primary Examiner* — Michael Andrews
(74) *Attorney, Agent, or Firm* — Dorsey & Whitney LLP

(57) ABSTRACT

Embodiments of the present invention relate to magnetic gears comprising first and second moveable members arranged to interact in a magnetically geared manner via a first electrical winding arrangement arranged to generate, at least in part, a first magnetic flux having a first number of pole-pairs, and one or more pole-pieces arranged to modulate the first magnetic flux to interact with a second magnetic flux having a second number of pole-pairs, wherein the first number of pole-pairs is less than the second number of pole-pairs.

23 Claims, 8 Drawing Sheets

(56) References Cited

U.S. PATENT DOCUMENTS

| | | |
|---|---|---|
| 2010/0090552 A1 | 4/2010 | Bright |
| 2010/0283345 A1 | 11/2010 | Atallah et al. |

FOREIGN PATENT DOCUMENTS

| | | | | |
|---|---|---|---|---|
| EP | 1843454 | 10/2007 | | |
| EP | 2043254 | 4/2009 | | |
| EP | 2250724 | 11/2010 | | |
| FR | 1560584 | 3/1969 | | |
| FR | 2518688 | 6/1983 | | |
| GB | 2437568 | 10/2007 | | |
| GB | 2437568 A | * 10/2007 | ............ | H02K 16/02 |
| GB | 2457682 | 8/2009 | | |
| GB | 2493484 | 2/2013 | | |
| WO | WO 96/22360 | 7/1996 | | |
| WO | WO 2007/064591 | 6/2007 | | |
| WO | WO 2008/018376 | 2/2008 | | |
| WO | WO 2009/103994 | 8/2009 | | |
| WO | WO 2009/147378 | 12/2009 | | |

\* cited by examiner

MAGNETIC GEAR WITH FIRST AND SECOND MEMBERS ARRANGED TO INTERACT IN A MAGNETICALLY GEARED MANNER

CROSS REFERENCE TO RELATED APPLICATIONS

This application is a continuation of U.S. patent application Ser. No. 12/995,798 filed Feb. 7, 2011 which claims the benefit of International Application No. PCT/GB2009/001365, filed May 29, 2009, having a claim of priority to GB patent application number 08 10097.6, filed Jun. 3, 2008.

FIELD OF THE INVENTION

Embodiments of the present invention relate to magnetic gears.

BACKGROUND TO THE INVENTION

Mechanical gearboxes are extensively used to match the operating speed of prime-movers to the requirements of their loads for both increasing rotational speed such as, for example, in a wind-powered generator or reducing rotational speed such as, for example, in an electric-ship propulsion arrangement. It is usually more cost and weight effective to employ a high-speed electrical machine in conjunction with a mechanical gearbox to achieve requisite speed and torque characteristics. However, while such a high-speed electrical machine in conjunction with a mechanical gearbox allows high system torque densities to be realised, such mechanical gearboxes usually require lubrication and cooling. Furthermore, reliability can also be a significant issue. Consequently, direct drive electrical machines are employed in applications where a mechanical gearbox cannot be used.

Several techniques of achieving magnetic gearing, using permanent magnets, are known within the art. For example, FIG. 1 shows the most commonly used topology for magnetic gears. It can be appreciated that FIG. 1 shows a magnetic gear 100 comprising a first, high-speed, rotor 102 bearing a plurality of permanent magnets 104 that is magnetically coupled, in a geared manner, to a second, low speed, rotor 106 comprising a number of permanent magnets 108. A significant disadvantage of the magnetic gear 100 shown in FIG. 1 is that the topology suffers from a very poor utilisation of the permanent magnets since very few of the permanent magnets simultaneously contribute to torque transmission at any given time. The very poor torque transmission capability has limited the use of magnetic gearing.

The problem associated with the magnetic gear 100 of FIG. 1 is solved by the magnetic gear 200 shown in FIG. 2. FIG. 2 shows a rotary magnetic gear 200 comprising a first or inner rotor 202, a second or outer rotor 204 and a number of pole pieces 206, otherwise known as an interference or an 5 interference means. The first rotor 202 comprises a support 208 bearing a respective first number of permanent magnets 210. In the illustrated magnetic gear, the first rotor 202 comprises 8 permanent magnets or 4 pole-pairs arranged to produce a spatially varying magnetic field. The second rotor 204 comprises a support 212 bearing a respective second number of permanent magnets 214. The second rotor 204 comprises 46 permanent magnets or 23 pole-pairs arranged to produce a spatially varying field. The first and second numbers of permanent magnets are different. Accordingly, there will be little or no useful direct magnetic coupling or interaction between the permanents magnets 210 and 214 such that rotation of one rotor will not cause rotation of the other rotor.

Pole pieces 206 are used to allow the fields of the permanent magnets 210 and 214 to interact in a geared manner. The pole pieces 206 modulate the magnetic fields of the permanent magnets 210 and 214 so they interact to the extent that rotation of one rotor will induce rotation of the other rotor in a geared manner. Rotation of the first rotor 202 at a speed $\omega_1$ will induce rotation of the second rotor 204 at a speed $\omega_2$ where $\omega_1 \ne \omega_2$. The gear ratio is directly related to the ratio of the number of pole-pairs on the outer rotor to the number of pole-pairs on the inner rotor. In the given example, which has 23 pole-pairs on the outer rotor and 4 pole-pairs on the inner rotor, the 25 gear ratio is 5.75:1. Therefore, in a magnetic gear, the rotors always have a different number of pole pairs.

However, the magnetic gear topology shown in FIG. 2 has the disadvantages that it is large in size for given operating conditions. That is, the magnetic gear must be designed to transmit a peak torque level to be encountered in operation, even though that peak torque may not be encountered more than momentarily. Hence the magnetic gear is large in size and expensive to produce. Further, iron losses are significant, for the magnetic flux which is provided by the permanent magnets must be sufficient to couple the rotors when subjected to the peak torque, even though this peak torque rarely occurs.

It is an object of embodiments of the present invention to at least mitigate one or more of the above problems of the prior art.

SUMMARY OF EMBODIMENTS OF THE INVENTION

Accordingly, a first aspect of embodiment of the present invention provides a magnetic gear comprising first and second moveable members arranged to interact in a magnetically geared manner via a first electrical winding arrangement arranged to generate, at least in part, a first magnetic flux having a first number of pole-pairs, and one or more pole-pieces arranged to modulate the first magnetic flux to interact with a second magnetic flux having a second number of pole-pairs, wherein the first number of pole-pairs is less than the second number of pole-pairs.

Further aspects of the invention are defined in the appended claims.

Magnetic gears according to embodiments of the present invention exhibit significant advantages in terms of simplicity, size and cost.

The winding arrangement may be known as an electromagnet. Preferably, the first magnetic flux generated by the electromagnets is modulated by the pole pieces such that asynchronous harmonics are created which have the same number of poles as the second magnetic flux. Preferably the pole pieces are ferromagnetic members.

The electromagnets may be energized to provide the first magnetic flux. The first magnetic flux is preferably modulated to cause coupling of moveable members.

The electromagnets may be arranged within a chamber interior to a moveable member. The electromagnets may be arranged around teeth of a moveable member. Alternatively, the electromagnets may be arranged within open slots of one or more flux-producing members. In this case, the electromagnets may be arranged in pairs in stacked relation. The electromagnets are preferably formed by windings or coils. In some embodiments, the plurality of electromagnets are associated with a moveable member and arranged in one relation, whilst a second plurality of electromagnets are associated with a second moveable member. The second plurality of electromagnets may be arranged in a different relation. Both first and second magnetic fluxes may be produced by electromagnets.

The electromagnets may be supplemented with permanent magnets. The permanent magnets may interpose one or a plurality of electromagnets.

The electromagnets are preferably supplied with a current/which varies according to a torque level transmitted through the magnetic gear. The current may be supplied by a controller. The current may be AC or DC. The controller may only supply current when the torque level exceeds a nominal torque level. The controller may disengage the magnetic gears by reducing the current and hence magnetic flux of the electromagnets. In this way, the magnetic gears may act like a clutch. The controller preferably attempts to maintain a load-load angle δ which is as close to 90 degrees as is feasible in the given application for varying torque levels.

Magnetic gears according to embodiments of the present invention preferably couple an input shaft to an output shaft and transmit torque there-between. Preferably, and particularly suitably for the present invention, the torque level varies over time. The torque level may vary between a nominal torque and a peak torque. In some embodiments, the electromagnets are only energised when the torque exceeds the nominal torque or a predetermined torque value. Embodiments of the present invention may be applied to turbines which generate torque at varying power levels, such as wind turbines.

Other embodiments are described below and claimed in the claims.

BRIEF DESCRIPTION OF THE DRAWINGS

Embodiments of the present invention will now be described, by way of example only, with reference to the accompanying drawings in which:

Detailed description of preferred embodiments FIG. 3 shows a magnetic gear 300 according to a first embodiment. The magnetic gear 300 comprises an inner rotor 302, an outer rotor 304 and a stator 306 interposing the inner 302 and outer 304 rotors. The inner 302 and outer 304 rotors are rotatable, as will be explained, and the stator 306 fixedly or statically arranged.

Figure 1:
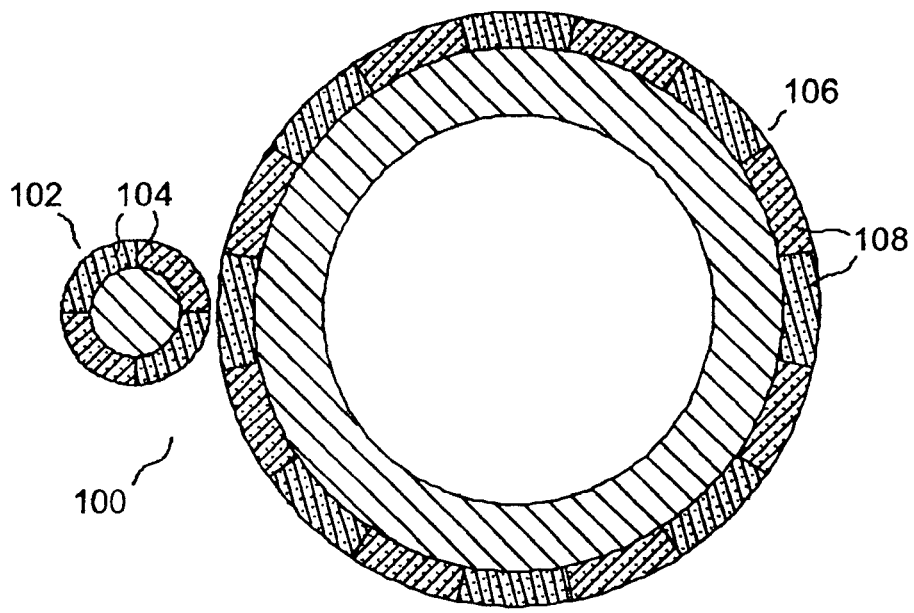
FIG. 1 shows a conventional magnetic gear.
Figure 2:
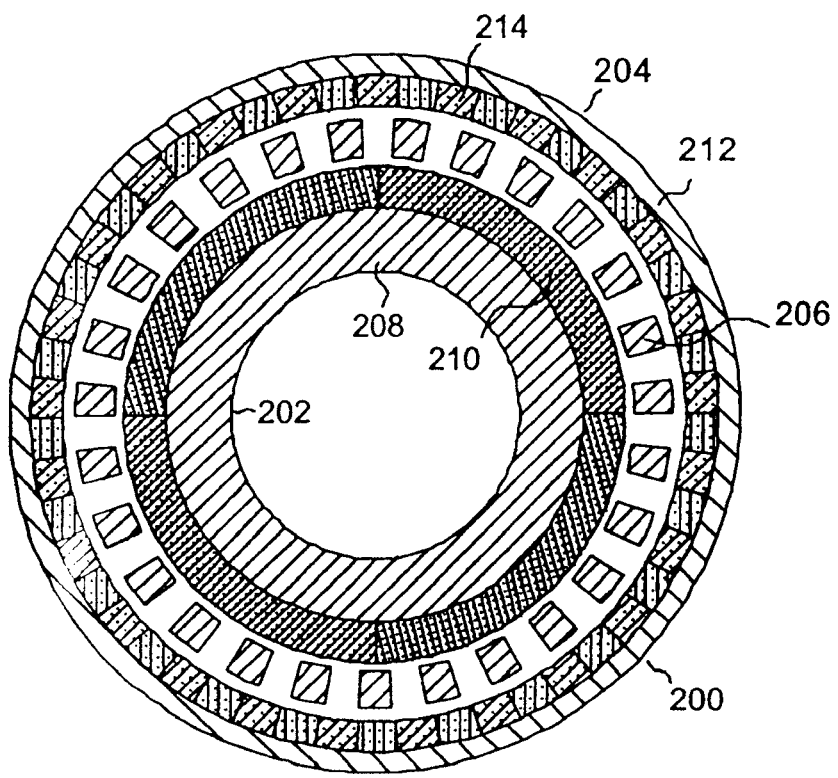
FIG. 2 shows a further conventional magnetic gear.
Figure 3:
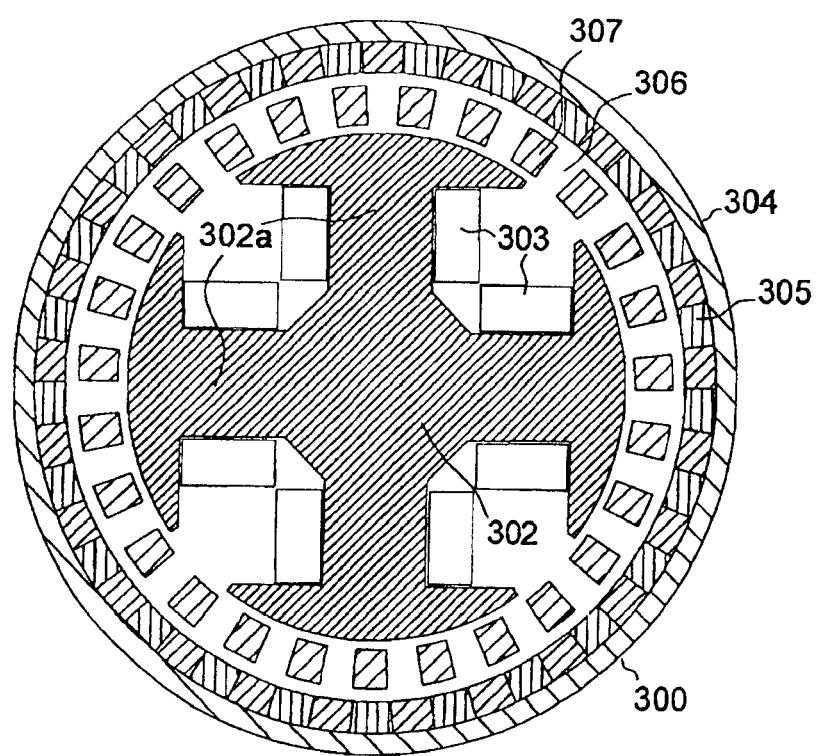
FIG. 3 shows a magnetic gear according to a first embodiment.

The inner rotor 302 comprises a plurality of salient teeth 302a around which windings 303 have been fitted, or wound, to form electromagnets. Due to the inner rotor 302 being rotatable, the plurality of windings 303 carried upon the inner rotor 302 are provided with an electrical current/from a controller (not shown) via one or more of a slip ring, rotating connection part, rotating supply or transformer. In the present embodiment, there are 4 windings arranged to form 2 pole pairs, although it will be realised that other numbers and arrangements of windings may be provided to provide other numbers of pole-pairs. In the first embodiment, the windings 303 are concentrated around the teeth 302a to provide salient poles.

The outer rotor 304 is formed by, for example, a back iron or other like substrate and comprises a number of permanent magnets 305 mounted on an inwardly facing surface thereof. In the shown embodiment there are 50 permanent magnets 305 arranged to form 25 pole-pairs, although it will be realised that other numbers permanent magnets may be provided to provide other numbers of pole-pairs. The number of poles carried by the outer rotor 304 is greater than the number of poles formed by the windings 303 carried on the inner rotor 302.

The stator 306 comprises a plurality of ferro-magnetic pole pieces 307. The pole pieces 307 are magnetically coupled to the magnetic field from the inner 302 and outer 304 rotors to produce a geared rotation between the inner 302 and outer 304 rotors using the above described principles, that is, to modulate the magnetic fields of, and couple in a geared manner, the permanent magnets 305 of the outer rotor 304 and the windings 303, when energised, of the inner rotor 302. When modulated, the magnetic fields interact to the extent that rotation of one rotor will induce rotation of the other rotor in a geared manner. That is, the pole-pieces 307 modulate the magnetic fields of the electromagnets 303 and permanents magnets 305 such that asynchronous harmonics of the magnetic field that is produced by each flux-producing member are created which have the same number of poles as the other flux-producing member and so interact. The asynchronous harmonics rotate at a different rate than the fundamental harmonic and create a gear ratio between the rotors.

The first embodiment 300 comprises a stator 306 which contains a plurality of ferro-magnetic pole-pieces 307 and two rotors 302, 304 consisting of flux-producing members 303, 305. However, it will be understood by those skilled in the art that the principle of the invention does not depend on which member is taken as the stator. Any member of the embodiment may form the stator, with the other two members forming the input and output rotors of the magnetic gear. It is further possible to allow all members to rotate, such that two rotating members constitute the input and output rotors, whilst the third member is rotated by an external electric machine to affect the gear ratio between the input and output rotors.

Advantages of the above-described arrangement will now be described. Firstly, the use of electromagnets to replace permanent magnets upon one or more rotating elements of a magnetic gear allows a physically smaller and consequently cheaper magnetic gear to be produced, due to the use of less materials. Typically, peak torque transmitted by a magnetic gear is only encountered for a small duration of an operating lifetime. However, a prior art magnetic gear arrangement must be designed to transmit the peak torque, and is consequently large in size. However, a magnetic gear according to embodiments of the present invention may be designed to transmit a nominal torque level which is typically encountered for a majority of the operating lifetime. When it is desired to transmit a torque level greater than the nominal torque, such as the peak torque level, a magnetic flux of the electromagnets carried upon one or more of the flux-producing members may be increased accordingly by the controller supplying an increased electrical current I to the windings. As a result, a physically smaller and cheaper to produce mechanical gear arrangement may be used. Such an advantage is particularly prevalent in applications in which a transmitted torque level is time variant. Further, the material which is typically used to construct a permanent magnet, NdFeB for example, is typically many times more expensive than the material which is used to build an electromagnet which can produce an equivalent magnetic field, such that a magnetic gear which uses electromagnets is generally cheaper than one which uses permanent magnets.

Secondly, during a majority of an operating lifetime when operating at the nominal torque level, the magnetic flux produced by the windings is reduced, compared to that generated by the permanent magnets of the prior art which is designed to transmit the peak torque. This results in reduced iron losses in the magnetic gear.

Thirdly, magnetic gears according to embodiments of the present invention may be used as a clutch, negating the need for a separate mechanically actuated clutch to be provided. In order to operate as a clutch, the magnetic flux of the windings 303 is reduced, or switched-off, by reducing the current/applied to the windings 303 such that the flux-producing members are magnetically decoupled.

Another advantage of the presented gear is its increased ease of manufacture. Handling permanent magnets and securing them in place is a complicated and highly skilled task. Because electromagnets produce no magnetic flux without a supply current, the assembly of the invention is much simplified compared to the prior art gear.

It is well understood by those skilled in the art that the advantages of the use electromagnets over the use of permanent magnets to provide flux in an electrical machine are more pronounced for machines of a larger size. This is due to the increase of the physical area of each magnetic pole with an increased machine size. Hence, it is envisaged that the advantages of the invention over the prior art are more pronounced for large gears, and for those gears where the flux produced by the flux-producing member with the lowest number of poles, and hence the largest pole-area, is provided by electromagnets.

Figure 4:
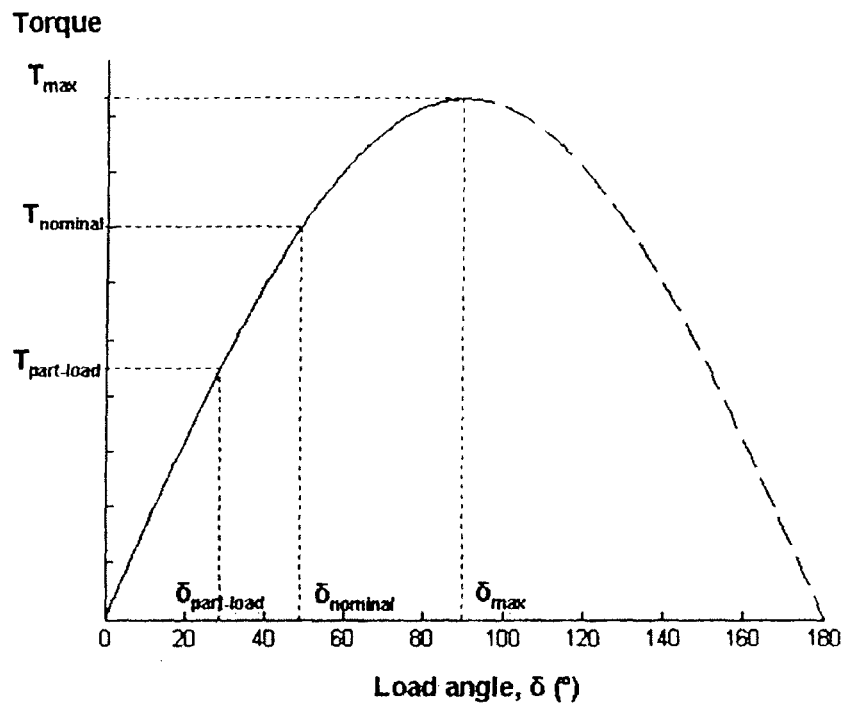
FIG. 4 shows a graph of load-angle against torque for a prior art magnetic gear.
Figure 5:
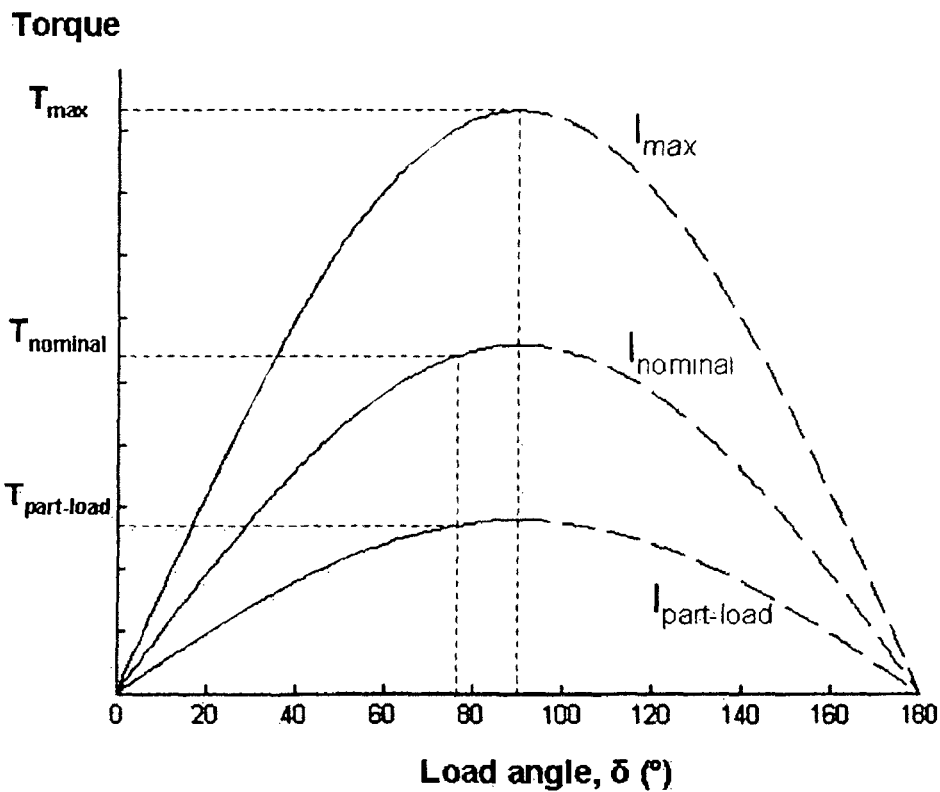
FIG. 5 illustrates a graph of load-angle against torque for a magnetic gear according to embodiments of the present invention.

Reference will now be made to FIGS. 4 and 5 which compare load-angle d against transmitted torque for magnetic gears of the prior art and the present invention.

Referring firstly to FIG. 4, load-angle against torque for a prior art magnetic gear is shown. Load-angle $\delta$ is an electrical angle between a magnetic field produced by a magnet array and a magnetic field with the same pole-number produced by the other magnetic array. The torque which is transmitted through the gear is a sinusoidal function of the load-angle, i.e. the load angle will automatically re-adjust when the torque through the gear varies. As is well understood from the theory of synchronous machines, the magnetic gear operates at a stable operating point when the load angle is smaller than 90°, shown on the left-hand side of the graph, whilst load angles larger than 90°, shown on the right-hand side of the graph in a dashed line, result in unstable operating points. At maximum torque transmission $T_{max}$, the gear will operate with a load-angle $d_{max}$ of 90° If a torque greater than $T_{max}$ is applied, then the gear will slip. At nominal load, the input torque is smaller, and the gear will automatically operate at a load-angle $d_{nominal}$ which is less than 90°. Because the flux-level in the prior-art magnetic gear is fixed, the torque carrying capacity of a prior art permanent magnet magnetic gear is fixed, and the gear must therefore be designed to be capable of transmitting a maximum operating torque $T_{max}$ expected in operation, even if this maximum torque is only expected to be encountered for a small fraction of the operating duration, or infrequently.

FIG. 5 shows the load-angle against torque for embodiments of the present invention for different values of the current which is supplied to the electromagnets. Because the flux in the embodiments of the invention can be varied through varying the current which flows through the windings of the electromagnets, the peak torque which can be transmitted by the magnetic gear is a function of the current in the windings. A controller controls the current/which is supplied to the electromagnets in order to maintain the load angle within the stable operating region but as close to 90° as possible. Advantageously, this allows the magnetic gear to be designed to transmit the nominal torque $T_{nominal}$ and to be consequently smaller and cheaper to produce than a prior art magnetic gear, which must be designed for the peak torque $T_{max}$. Peak torque is accommodated in the invention by increasing the current I flowing in the windings to a maximum value $I_{max}$. The maximum torque that can be transmitted through the gear is a function of the maximum current of the electromagnets and the duration for which the peak torque is encountered and this current must be maintained, since over-heating of the windings may become an issue. At part load, current in the windings is reduced in order to maintain the load-angle close to 90°. This consequently reduces copper losses. Iron losses are also reduced by the consequential reduction in magnetic flux at part loads.

Figure 6:
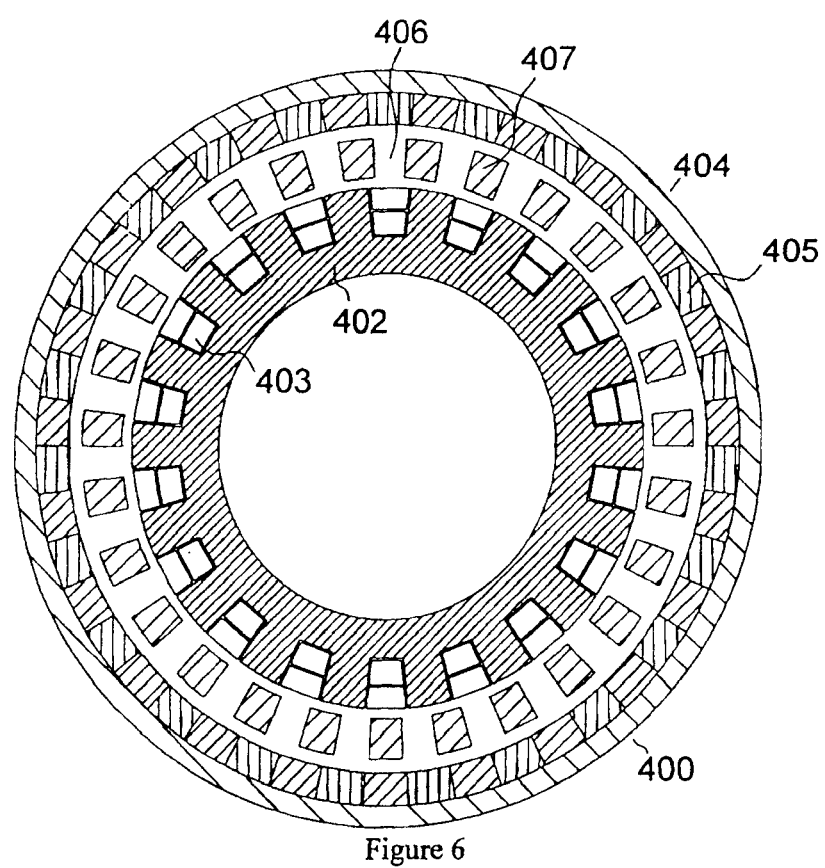
FIG. 6 depicts a magnetic gear according to a further embodiment.

FIG. 6 shows a second preferred embodiment of the present invention. The embodiment shown replaces the salient poles with concentrated windings on the inner flux-producing member of the first embodiment with a plurality of distributed windings which are fitted in a number of slots distributed around an inner rotor.

The second preferred embodiment 400 comprises an outer rotor 404 carrying a plurality of permanent magnets 405 and a stator 406 comprising a plurality of pole pieces 407 as in the first preferred embodiment.

The second embodiment 400 further comprises an inner rotor 402 carrying a plurality of windings 403 which form electromagnets. The windings 403 are arranged in open slots, or blind-apertures, distributed around the outer circumference or periphery of the inner rotor 402. The windings 403 are arranged in layers within the open slots. The windings which are shown in FIG. 6 are configured to result in a magnetic field which has 4 poles. The current in the windings 403 may be an AC or a DC current. When a DC current is applied to the windings 403, the magnetic field is stationary compared to the inner rotor 402, and hence moves at the same speed as the mechanical speed of the inner rotor 402 compared to an external reference frame. In case an AC current is applied to the windings 403, the magnetic field that is produced by the windings moves at a different speed than the mechanical speed of the inner rotor 402. As explained previously, the outer rotor 404 couples with an asynchronous harmonic of the magnetic flux that is produced by the inner rotor 402, and hence the mechanical speed of the outer rotor 404 is a function of the speed of the magnetic field that is produced by the inner rotor 402, which is not equal to the mechanical speed of the inner rotor 402 when an AC current is applied. Therefore, the application of an AC current allows for a gear ratio between the input and output rotors 402, 404 of the magnetic gear which is variable and which is a function of the frequency of the AC current. More particularly in this embodiment, a spatially distributed multi-phase winding is supplied by multiphase ac currents that are temporally displaced. The generated field of the rotor hosting the winding then rotates relative to the rotor (in either direction) allowing a gear ratio to be varied.

The second embodiment operates in a like-manner to the above described first embodiment. However, the second embodiment is particularly suited to high speed applications in which the inner rotor 402, in particular, rotates at least during a part of the operating period at high-speed. The high-speed suitability of the second embodiment is provided by the inner rotor 402 having less aerodynamic drag compared with the first embodiment.

Figure 7:
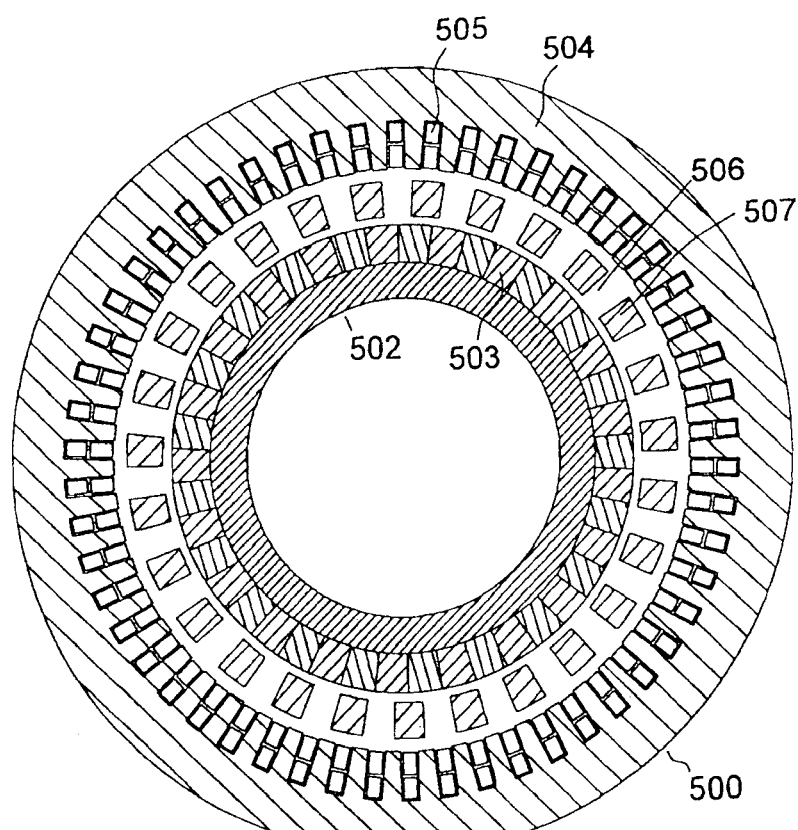
FIG. 7 shows another embodiment of a magnetic gear.

FIG. 7 shows a third preferred embodiment of the present invention. In this embodiment, an outer rotor magnetic field is produced by electromagnets.

The third embodiment 500 comprises an inner rotor 502 carrying a plurality of permanent magnets 503 on an outer periphery thereof and a stator 506 carrying a plurality of pole pieces 507, as in the prior art. However, an outer rotor 504 comprises a plurality of open slots distributed around the inner circumference or periphery of an inner surface of the outer rotor 504. A plurality of winding 505 are arranged in layers within the slots to provide 4 pole-pairs, however the winding can be configured to generate a magnetic field with another number of pole pairs as will be appreciated. It will also be realized that the outer rotor 504 could comprise concentrated windings and salient magnetic poles as in the first embodiment.

Although as described with the inner rotor 502 and outer rotor 504 being rotatable around and within, respectively, the fixed pole pieces 507 it will also be realized that the outer rotor 504 may be fixed, hence becoming a stator, and the pole-pieces 507 being mounted upon a rotor to rotate in cooperation with the inner rotor 502. Such a structure has the advantage that all windings to be provided with an electrical current are mounted in a fixed position and slip rings and the like are not required.

Figure 8:
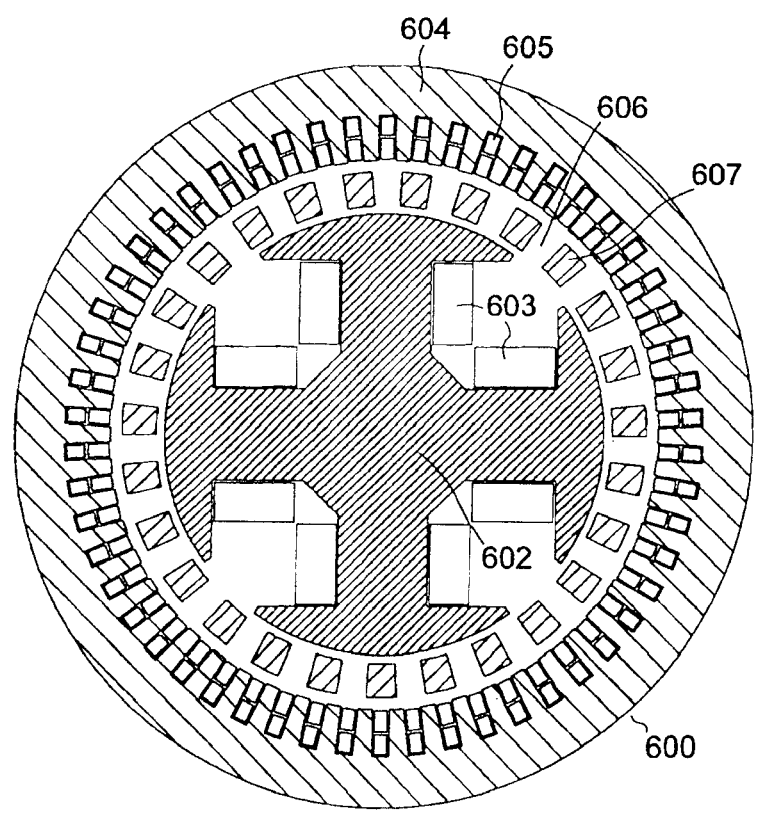
FIG. 8 illustrates yet another embodiment of a magnetic gear.

FIG. 8 shows a fourth preferred embodiment of the present invention. In this embodiment, both inner rotor and outer rotor magnetic fields are produced by electromagnets.

The fourth embodiment 600 comprises an inner rotor 602 having an identical arrangement to the first embodiment 300, comprising a plurality of concentrated windings 603 which are wound on salient poles. As shown, the fourth embodiment 600 comprises two pole-pairs on the inner rotor 602, although other numbers of pole-pairs can be envisaged. The fourth embodiment 600 further comprises a stator 606 carrying a plurality of ferro-magnet pole pieces 607 and an outer rotor 604 comprising a plurality of windings 605 forming electromagnets which are distributed around an inner periphery of the outer rotor 604, as in the third embodiment.

The fourth embodiment 600 has two primary advantages. Firstly, due to replacement of all permanent magnets with windings 603, 605, the magnetic gear 600 is cheaper to produce and easier to manufacture. Secondly, it would be possible to change the gear ratio of the magnetic gear by only selectively energizing pluralities of windings from the plurality of windings carried by both rotors 604, 602 or by re-arranging the configuration of the windings such that they produce a magnetic field at a different number of poles. It will be recalled that the torque of the magnetic gear is established by modulation by the pole pieces 607 of the magnetic flux that is generated by each flux-producing member, such that asynchronous harmonics are created which have the same number of magnetic poles as the other flux-producing member. Therefore, the variation of the number of magnetic poles on one flux-producing member only, would result in asynchronous harmonics with a number of pole-pairs which is different than the number of pole pairs on the other flux-producing member, such that no torque would be transmitted by the gear. Therefore, for torque transmission, the number of poles on each flux-producing member must be changed simultaneously. This would lead to a corresponding change in the gear ratio between rotors 602, 604.

Figure 9:
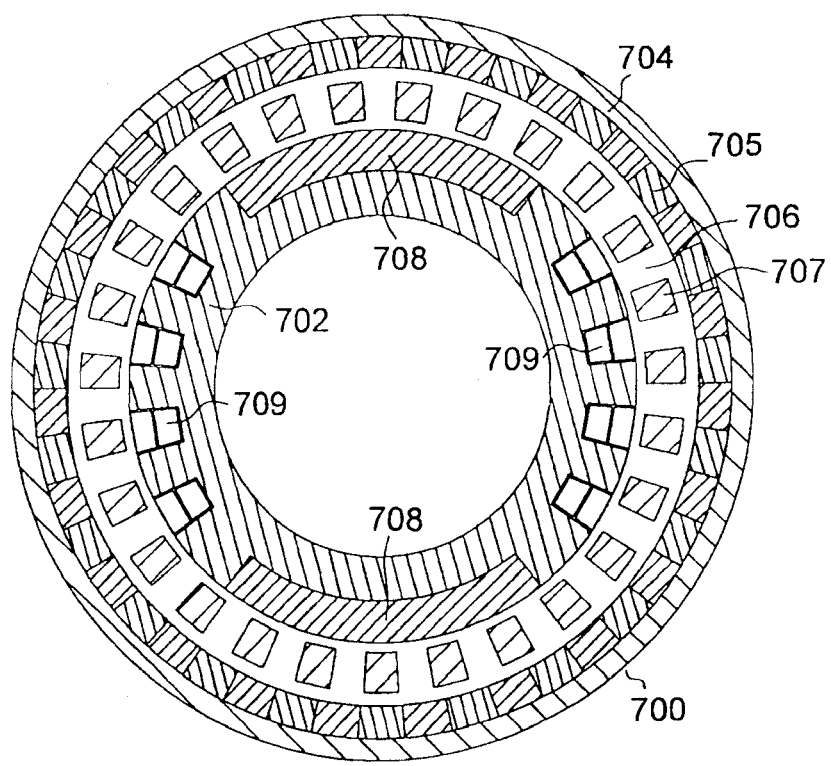
FIG. 9 illustrates yet another embodiment of a magnetic gear.

FIG. 9 shows a fifth embodiment of the present invention. In the fifth embodiment 700, a combination of permanent magnets and windings are carried by one or more flux-producing members.

The fifth embodiment 700 comprises an outer rotor 704 carrying a plurality of permanent magnets 705 and a stator 706 carrying a plurality of ferro-magnetic pole-pieces 707, as in the first embodiment 300. An inner rotor 702 carries a plurality of permanent magnets 708 in combination with a plurality of windings 709 forming electromagnets, such that the flux from the inner magnet is produced by both permanent magnets and electromagnets. In the shown embodiment, the magnets and the windings are equally spaced and radially interpose each other, but it will be realised that other arrangements of permanent magnets and windings 708, 709 may be envisaged. Further, the outer rotor 704, or both the inner and outer rotors 702, 704, may carry a combination of permanent magnets 708 and windings 709.

An advantage of the use of one or more rotors carrying a combination of permanent magnets and windings will now be described. A magnetic gear may be designed to carry a nominal torque level for a majority of an operating period. A determined number of permanent magnets may be arranged about one or more rotors, such that the nominal torque level, or the nominal torque level and a safety margin, may be transmitted by the magnetic gear. If, in a conventional magnetic gear, it was then attempted to transmit a torque level in excess of the nominal torque level, or the nominal torque level and safety margin, slippage of the magnetic gear would then occur. However, in the fifth embodiment 700, the controller is arranged to energize one or more windings 709 when a greater torque level is desired to be transmitted. That is, the controller would energize at least some windings 709 to allow a peak torque level to be transmitted. Energizing the windings 709, it will be realized, does not have to be a binary operation, but may be gradually energized by increasing current/to carry increasing torque if desired.

Embodiments of the present invention are particularly suited to applications in which torque load varies over time. For example, embodiments of the present invention are particularly suited to use in power generation equipment, such as turbines, wind turbines, wave-power turbines etc. Further, embodiments of the present application are suited to propulsion applications, such as electric-drive propulsion apparatus, and also to variable-load industrial applications such as pumps.

Also, although the above embodiments have been described with reference to radial field rotors and rotation, embodiments can equally well be realized using axial field rotors and rotation as well as translators and translation, that is, the principles of embodiments of the present invention can be realized in the context of linear gears.

Figure 10:
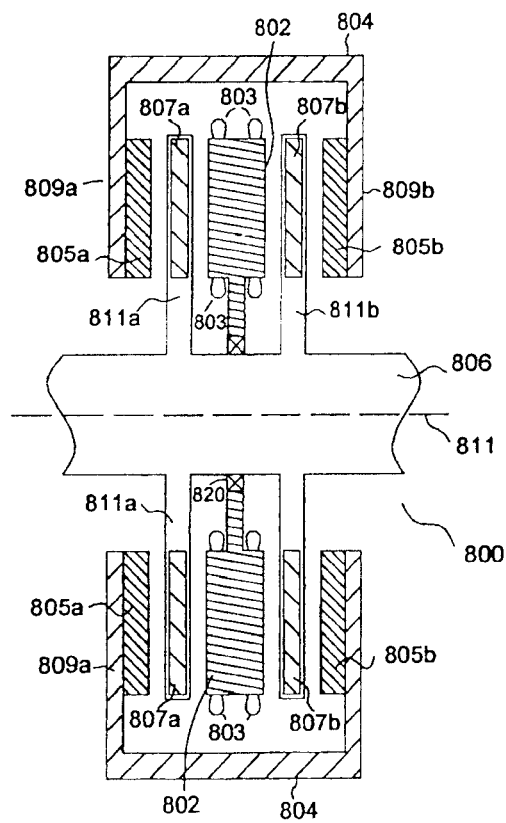
FIG. 10 illustrates yet another embodiment of a magnetic gear.

FIG. 10 illustrates a sixth embodiment of the invention. An axial-field magnetic gear 800 is axisymmetric around axis 811 and comprises a low-speed rotor 806 which is connected with two discs 811a and 811b carrying a plurality of pole-pieces 807a and 807b. An inner rotor 802 carries a plurality of windings 803 forming electromagnets. The embodiment further comprises stators 804 to which two discs 809a and 809b are attached, which contain pluralities of permanent magnets 80Sa and 805b. Although the embodiment is described in relation to rotors 802/806 and a stator 804, it is not essential to the principle of the invention which component is configured to be stationary, and which component functions as the input rotor or output rotor.

The sixth embodiment 800 is shown to be symmetric around a symmetry plane which cuts through the centre of disc 802 and is perpendicular to the symmetry axis 811. The components which are symmetric to one another have been referred to in FIG. 10 with identical numbers but with different indices a) and b). Such a symmetric embodiment has the advantage that the axial forces on each component cancel, such that no net axial force is exerted on any component of the shown embodiment, and inexpensive bearing system can be used. However, it will be understood that the shown embodiment can equally operate without this symmetry, as can be achieved by, for example, omitting all parts in FIG. 10 with index b), although a more robust and expensive bearing system will result.

Figure 11:
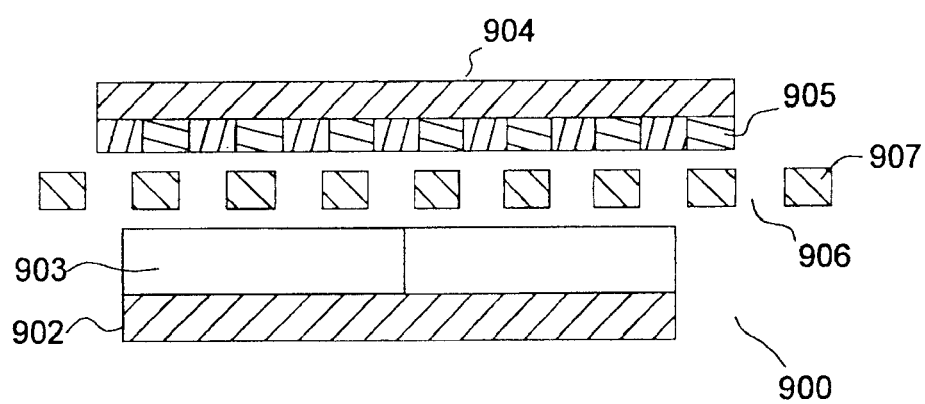
FIG. 11 illustrates yet another embodiment of a magnetic gear.

FIG. 11 shows an embodiment of the present invention as realized in a linear magnetic gear 900, which could be implemented as a planar device or a tubular device. The magnetic gear 900 comprises an outer stator 904 to which a plurality of permanent magnets 905 have been connected. The embodiment further comprises a low-speed translator 906 which contains a plurality of ferro-magnetic pole-pieces 907. The gear 900 also comprises an inner translator 902, to which a plurality of windings 903 has been attached. It will be understood by those skilled in the art that the shown embodiment operates in an essentially similar manner to previously described embodiments, and that it is not essential which part of the gear is configured as a stator and which parts have been configured to operate as input/output translator.

The above embodiments have been described with reference to the inner rotor driving the outer rotors. However, it will be appreciated that embodiments can be realised in which an outer rotor drives an inner rotor 30 thereby reversing the gear ratio. Further, all previous embodiments have been described with reference to an inner and outer rotor and a stator which is positioned between the rotors. However, it will be understood that any of the previous embodiments could operate with a moving middle pole-piece structure, with either the inner or outer flux-producing member configured to be static. It is further possible to rotate all three members, such that two of the moving members are configured as the input and output rotors, whilst the third moving member is rotated to change the speed-relationship between the input and output rotors, as is known in the prior-art magnetic gears.

Further, it will be understood that combinations of aspects of the various embodiments which have been described are part if the invention. To this respect, the illustrated embodiments serve as examples of the introduction of electro-magnets within a magnetic gear. It will be clear, however, that other winding arrangements are possible, which are well-known in the art of electrical machine design.

The invention claimed is:

1. A magnetic gear system comprising:
a magnetic gear comprising first and second moveable members adapted to interact in a magnetically geared manner via a first electrical winding arrangement adapted to generate, at least in part, a first magnetic flux having a first number of pole-pairs, and one or more pole-pieces adapted to modulate the first magnetic flux to interact with a second magnetic flux having a second number of pole-pairs, wherein the first electrical winding arrangement is associated with one of the first moveable member, the second moveable member, and a stator, and the second magnetic flux is associated with another of the first moveable member, the second moveable member, and the stator; wherein one of the first and second moveable members is adapted to be coupled to an input shaft of the magnetic gear and the other of the first and second moveable members is adapted to be coupled to an output shaft of the magnetic gear, the input shaft being coupled to a prime-mover that is external to the magnetic gear; and wherein the magnetic gear system is adapted to transmit torque through the magnetic gear in a geared manner; and
a controller adapted to supply multiphase, temporally displaced, AC currents to the first electrical winding arrangement, wherein the first electrical winding arrangement is a spatially distributed multi-phase winding, to produce a rotating field, wherein a ratio of the gear is varied as a function of the frequency of the AC current.

2. The magnetic gear system as claimed in claim 1, wherein the first number of pole-pairs is less than the second number of pole-pairs.

3. The magnetic gear system as claimed in claim 1, wherein the second magnetic flux is generated by a plurality of permanent magnets.

4. The magnetic gear system as claimed in claim 3, wherein the first electrical winding arrangement is associated with the stator and the plurality of permanent magnets is associated with one of the first or second moveable members.

5. The magnetic gear system as claimed in claim 4, wherein the pole-pieces are associated with the other of the first or second moveable members.

6. The magnetic gear system as claimed in claim 1, wherein the second magnetic flux is generated, at least in part, by a second electrical winding arrangement.

7. The magnetic gear system as claimed in claim 6, wherein the first electrical winding arrangement is associated with the stator and the second electrical winding arrangement is associated with one of the first or second moveable members.

8. The magnetic gear system as claimed in claim 7, wherein the pole-pieces are associated with the other of the first or second moveable members.

9. The magnetic gear system as claimed in claim 1, wherein the first magnetic flux couples the first and second moveable members to interact in the magnetically geared manner.

10. The magnetic gear system as claimed in claim 1, wherein the first magnetic flux is partly generated by one or more permanent magnets.

11. The magnetic gear system as claimed in claim 1, wherein the first electrical winding arrangement is adapted to form salient poles.

12. The magnetic gear system as claimed in claim 1, wherein the first and second moveable members are coupled by asynchronous harmonics of the first magnetic flux.

13. The magnetic gear system as claimed in claim 1, wherein the first electrical winding arrangement is arranged in layers.

14. The magnetic gear system as claimed in claim 1, wherein the controller is adapted to provide an electrical current to, at least, the first electrical winding arrangement and is adapted to control the electrical current in response to a torque level transmitted by the magnetic gear.

15. The magnetic gear system as claimed in claim 14, wherein the controller is adapted to control the electrical current to maintain a load-angle in a predetermined range.

16. The magnetic gear system as claimed in claim 15, wherein the electrical current is controlled to maintain a load angle at substantially 90 degrees.

17. A method of controlling a magnetic gear comprising first and second moveable members adapted to interact in a magnetically geared manner, wherein one of the first and second moveable members is adapted to be coupled to an input shaft of the magnetic near and the other of the first and second moveable members is adapted to be coupled to an output shaft of the magnetic gear, the input shaft being coupled to a prime-mover that is external to the magnetic gear, and wherein the magnetic gear is adapted to transmit torque through the magnetic gear in a geared manner, the method comprising:
energising a plurality of electromagnets to generate, at least in part, a first magnetic flux having a first number of pole-pairs, and modulating the first magnetic flux to cause a geared interaction with a second magnetic flux having a second number of pole-pairs, wherein one or more electromagnets comprise a spatially distributed multi-phase winding;
energising one or more of the electromagnets by multi-phase, temporally displaced, AC currents to produce a rotating field, wherein a ratio of the magnetic gear is varied as a function of the frequency of the AC current; and
controlling the magnitude of the current supplied to the electromagnets to control the magnitude of torque transmitted through the first moveable member and the second moveable member.

18. The method as claimed in claim 17, wherein the first number of pole-pairs is less than the second number of pole-pairs.

19. The method as claimed in claim 17, further comprising determining the first magnetic flux level according to a level of torque transmitted by the magnetic gear.

20. The method as claimed in claim 19, wherein the first magnetic flux level is determined to maintain a load-angle in a predetermined range.

21. The method as claimed in claim 19, wherein the first magnetic flux level is determined to maintain the load-angle at substantially 90 degrees.

22. The method as claimed in claim 17, wherein the plurality of electromagnets is energised when a level of torque transmitted by the magnetic gear exceeds a predetermined value.

23. A magnetic gear system comprising:
a magnetic gear comprising first and second moveable members adapted to interact in a magnetically geared manner via a first electrical winding arrangement adapted to generate, at least in part, a first magnetic flux having a first number of pole-pairs, and one or more pole-pieces adapted to modulate the first magnetic flux to interact with a second magnetic flux having a second number of pole-pairs, wherein the first electrical winding arrangement is associated with a stator, the pole-pieces are associated with one of the first and second moveable members; and the second magnetic flux is associated with the other of the first and second moveable members; wherein one of the first and second moveable members is adapted to be coupled to an input shaft of the magnetic near and the other of the first and second moveable members is adapted to be coupled to an output shaft of the magnetic gear, the input shaft being coupled to a prime-mover that is external to the magnetic gear; and wherein the magnetic gear system is adapted to transmit torque through the magnetic near in a geared manner; and
a controller adapted to supply multiphase, temporally displaced, AC currents to the first electrical winding arrangement, wherein the first electrical winding arrangement is a spatially distributed multi-phase winding, to produce a rotating field, wherein a ratio of the gear is varied as a function of the frequency of the AC current.

* * * * *